UNITED STATES PATENT OFFICE.

HERMAN C. BECKMAN AND GEORGE E. DYCK, OF CHICAGO, ILLINOIS, ASSIGNORS TO NATIONAL SYNTHETIC PRODUCTS CO., OF CHICAGO, ILLINOIS, A CORPORATION OF NEW JERSEY.

PROCESS OF MAKING ARTIFICIAL CREAM.

1,190,369. Specification of Letters Patent. Patented July 11, 1916.

No Drawing. Application filed September 19, 1912. Serial No. 721,142.

*To all whom it may concern:*

Be it known that we, HERMAN C. BECKMAN and GEORGE E. DYCK, citizens of the United States, residing at Chicago, in the county of Cook and State of Illinois, have invented a certain new and useful Improvement in Processes of Making Artificial Cream, of which the following is a full, clear, concise, and exact description, reference being had to the accompanying drawings, forming a part of this specification.

Our invention relates to a method or process of making cream artificially, and its object is to provide a simple, practical and effective method of making cream or the like, so that the product shall be a very close resemblance to, if not in fact substantially identical with natural cream, and shall be pure, healthful and wholesome in every respect, and capable of being utilized for all the purposes for which natural cream can be used, and at the same time the process is very cheap and expeditious.

In accordance with our invention we provide certain ingredients, pretty largely the natural ingredients of cream, and we mix and manipulate these in such a way as to form the cream. We may take, for example, beef fat, or in lieu thereof, butter fat, animal or vegetable oils, such as oleo, olive, cotton-seed or peanut oil, or a mixture of the two, together with either full milk, condensed milk, milk prepared with milk powder, or skim milk, and milk sugar or any other sugar or glucose, and lecithin if desired, and these we will combine in suitable manner, one satisfactory method of which we find to be as follows: We heat the oil, beef or butter fat, and then dissolve the lecithin in the oil (if lecithin be used), the lecithin being soluble in such fat. The milk sugar or other sugar is dissolved in the milk, in full milk or skim milk, whichever may be used. These two mixtures are then united, as for example by pouring both of them into a container provided with some suitable agitator and surrounded by a steam or hot water jacket, or having some other suitable agitating and heating arrangement. We find it desirable, although not essential to put the milk with the sugar dissolved in it into the container first and then heat that mixture to start the agitator, and then pour in the fat or oil solution with the lecithin dissolved in it, the same having been previously heated to bring it to a liquid state. Then the entire mixture is pasteurized and then emulsified. It is then taken out and cooled, preferably by running it through some suitable cooler or cooling apparatus. To this mixture after cooling we preferably, though not necessarily, add a certain amount of starch. However, the use of this particular agent is not an essential feature of our process, as we may use any one of various agents to produce the result desired in this respect, which is that of binding the ingredients together to prevent separation, or of stabilizing the product. For instance, we have used besides starch, rennet and other active ferments, gelatin, calcium sucrate, gum tragacanth, gum arabic, Iceland moss, Irish moss, and carragheen moss. The above agents also have a thickening effect.

We have obtained good results also by merely oxidizing the product after pasteurization, by blowing through it air or air containing ozone. In the step of oxidizing the product we find that ozone possesses a remarkable efficiency and produces a superior article due to its stabilizing effect. This agent also has a thickening effect.

The product made as above is palatable, and can be used in place of natural cream in all ways in which the latter is used. The product made as above is also quite stable, the oil being so thoroughly incorporated into the milk base that it does not separate out under ordinary circumstances. We attribute this result largely to the use of starch or similar agent, as described above, since the oil quickly separates on standing if it is attempted to make the cream without using such an agent, which has the effect of binding the various ingredients together and so stabilizing the product. We find, however, that under certain severe circumstances the agents or ingredients mentioned above do not make the product sufficiently stable. For instance, if the product is shipped a long distance by rail, as from Chicago to St. Louis, the oil is apt to separate from the milk base, due perhaps to the jarring in transit, rendering the product valueless as cream. To further bind the oil to the base, therefore, and to render the product sufficiently stable to withstand rail transportation, we add casein, preferably in solution, although it may be added undissolved. Casein is soluble in practically any alkaline solution. Consequently we may dissolve the casein in any harmless alkaline solution. Bicarbonate of soda, ammonia water, caustic soda, sal soda, or caustic potash may be used in either hot or cold water to provide a solvent for the casein. We prefer to use bicarbonate of soda on account of its absolute harmlessness. Consequently, if casein is used in our process, it is dissolved in a solution of bicarbonate of soda and added to the mixture at any time during the process, but preferably prior to emulsification. The finished product is then ready for delivery.

If desired we can add some ingredient which will serve as coloring matter, such ingredient being well known on the market. We can then, if desired, add other ingredients which are at times desirable to add. For instance we can add any one or more, or all of the following: cholesterol, phytosterol, or lipochrome. These are all natural ingredients of cream and will serve to give the product more of the properties of the natural article. These elements may be added either in addition to or in place of lecithin. They are desirably added prior to pasteurization. If desired we will also add, and these would also desirably be added prior to pasteurization, any one or more or all of the glycerids of the following acids, to-wit: acetic, butyric, caproic, caprylic, lauric, myristic, palmitic, stearic, arachidic and oleic, the same being ingredients of natural cream.

The cream made by this process will be clean and pure, the whole having been pasteurized and the various elements having been inspected and purified as required by pure food laws, before they are used. It will be seen that all of the ingredients used, with the exception of starch, are natural ingredients of cream, the starch being simply used as a binder or thickener. The glycerid of butyric acid will serve to flavor the product, it being one of the natural flavoring elements. The cream is thoroughly wholesome and palatable and resembles natural cream very closely, and can be used in all the ways that natural cream can be, either as such, or by being manufactured into other products such as butter, ice cream and pastry and the like.

It will be understood that changes and modifications can be made without departing from the spirit of the invention.

What we claim as our invention is:

1. The process of making artificial cream which consists in preparing a mixture of an oleaginous substance, a milk base, adding casein, pasteurizing and emulsifying the whole, and subjecting the resulting product to the action of a binding agent.

2. The process of making artificial cream which consists in preparing a mixture of an oleaginous base, a milk base, adding casein, pasteurizing and emulsifying the whole, and adding starch.

3. The process of making artificial cream which consists in preparing a mixture of an oleaginous base, a milk base, adding casein in solution, pasteurizing and emulsifying the whole, and adding starch.

4. The process of making artificial cream which consists in preparing a mixture of an oleaginous substance and a milk base, pasteurizing and emulsifying the same, and subjecting the resulting product to the action of oxygen.

5. The process of making artificial cream which consists in preparing a mixture of an oleaginous substance and a milk base, pasteurizing and emulsifying the same, and subjecting the resulting product to the action of ozone.

In witness whereof, we hereunto subscribe our names this 5th day of July, A. D., 1912.

HERMAN C. BECKMAN.
GEORGE E. DYCK.

Witnesses:
A. MILLER BELFIELD,
A. L. JONES.